Nov. 5, 1940.　　　W. TAMMINGA　　　2,220,467
DISPENSING APPARATUS
Filed July 12, 1939　　　4 Sheets-Sheet 1

INVENTOR.
William Tamminga
BY　Cornelius Zabriskie
ATTORNEY.

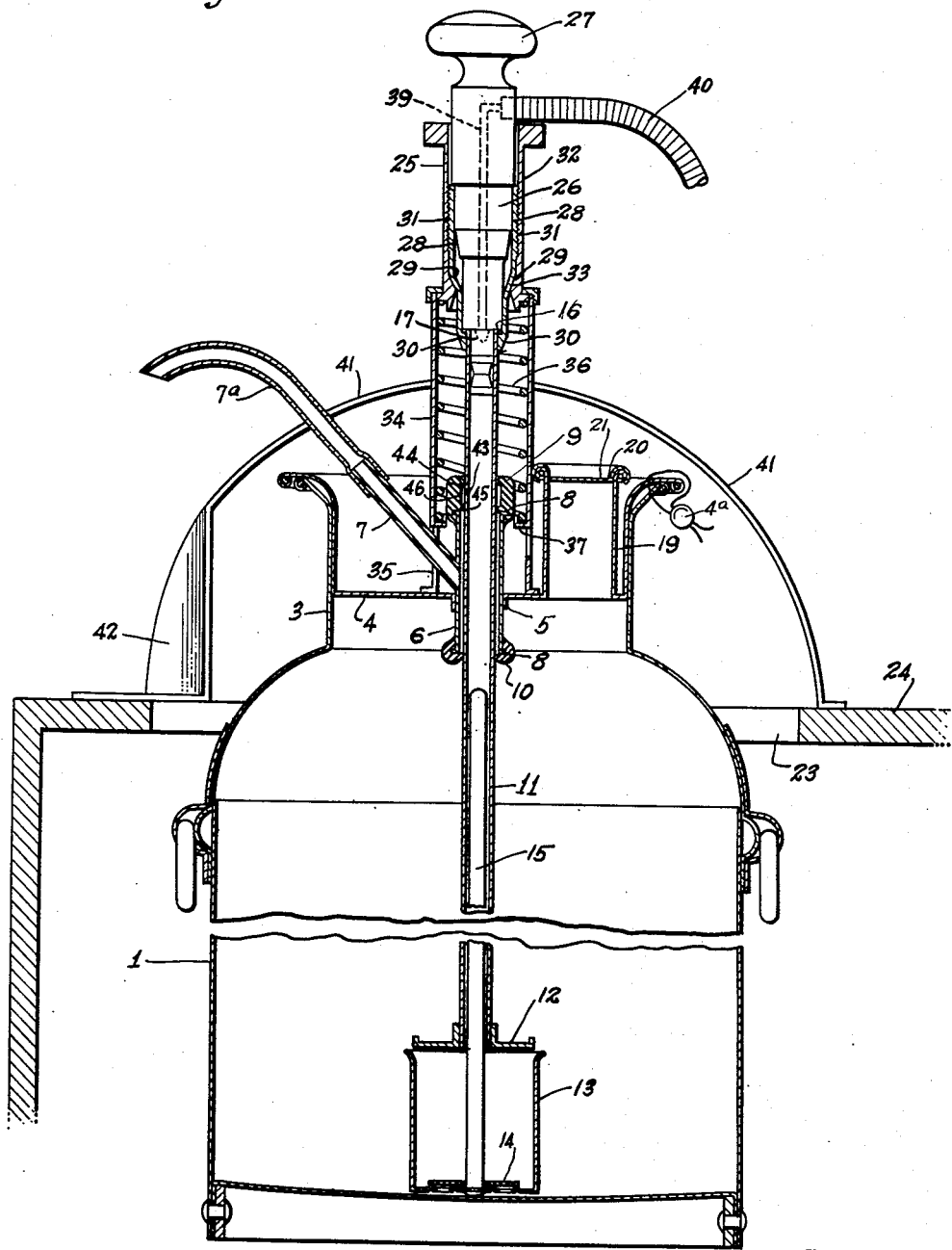

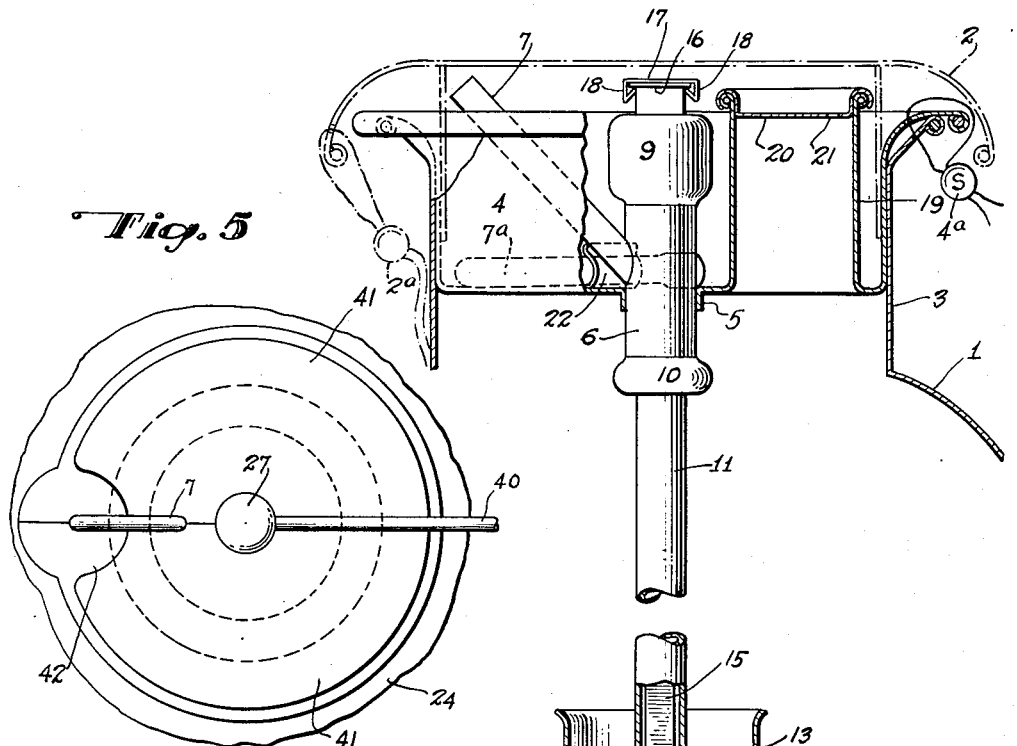
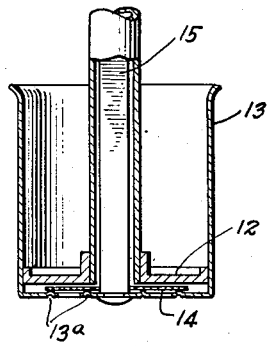
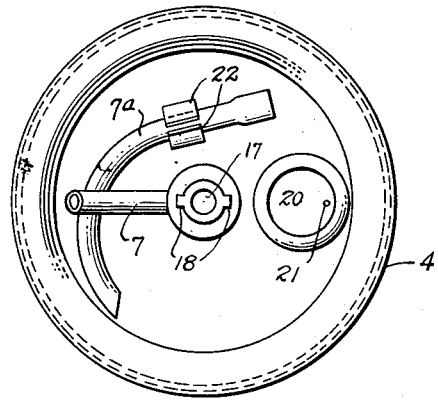

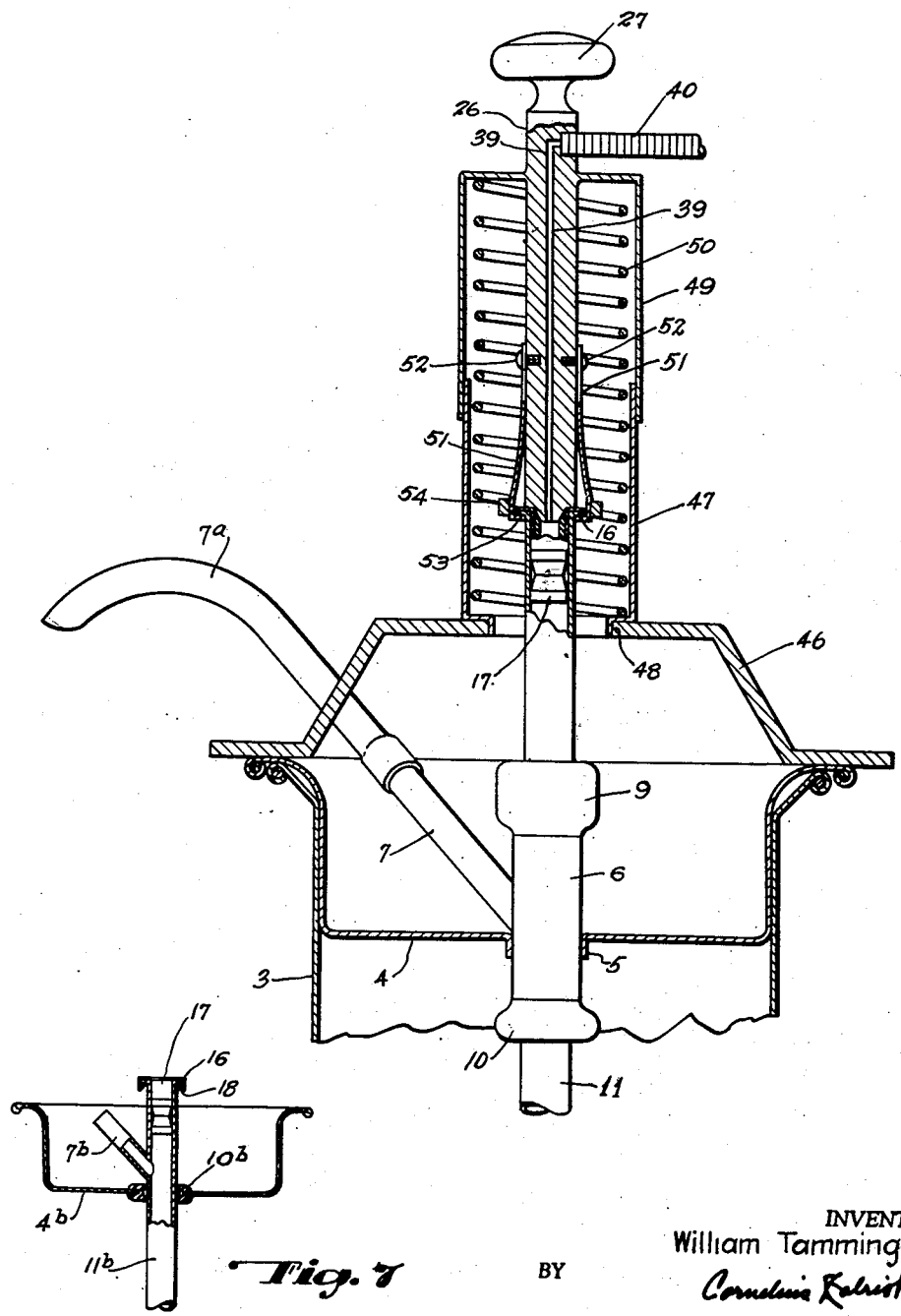

Patented Nov. 5, 1940

2,220,467

UNITED STATES PATENT OFFICE 2,220,467

DISPENSING APPARATUS

William Tamminga, Bronx, N. Y., assignor to Monitor Process Corporation, Jersey City, N. J., a corporation of New Jersey Application July 12, 1939, Serial No. 284,009

15 Claims. (Cl. 221—85)

This invention is an apparatus for dispensing milk through the top of a can while the can remains in upright position and provides means whereby a measured quantity of milk can be dispensed at each operation.

It is of course well known to dispense milk through the top of a can by means of pumps, and other adjuncts, but in practically every case the mechanism whereby this operation is accomplished is adapted to be inserted into the can by the retailer and must be sterilized and kept clean by him. It forms no part of the structure furnished by the milk distributing company, but is the property of the retailer and cleanliness depends entirely upon the care which he may exercise in this connection. Experience has shown that milk retailers are apt to become careless with the result that the milk dispensed may be unsafe or unfit for human consumption because of perfunctory cleaning operations on the apparatus entrusted wholly to their care.

The object of the present invention is to provide a simple and thoroughly efficient apparatus which may be so associated with the can as to be shipped from the creamery therewith, and as a part thereof, so that the milk can, as delivered by the milk distributor to the retailer, has associated therewith the mechanism of the present invention in thoroughly clean and sterile condition. All parts of the apparatus with which the milk may come in contact are thus safe-guarded against pollution at the time the milk is sealed in the can and remain in this condition until the entire contents of the can have been dispensed. With this arrangement the maintenance of cleanliness is removed from the sphere of the retail dealer and the sanitary condition of the milk is not dependent upon him in any way.

A further feature of the invention consists in incorporating, in mechanism of the character described, simple and efficient means for controlling the amount of milk dispensed at each operation, so that, for example, a glass of milk is dispensed each time the apparatus is manually manipulated.

Another object of the invention is to insure thorough agitation of the milk within the can in order that an equitable distribution of cream throughout the milk may be at all times assured.

Speaking generally the present invention consists in associating with an ordinary shipping can, such, for example, as a 20 or 40 quart can, a supplementary inner cover adapted to fit well into the neck of the can and on this inner cover, which serves in itself as a tight closure, is supported dispensing mechanism adapted to be sterilized with the can at the creamery before milk is introduced into the can. This mechanism includes a pump piston operable within a measuring receptacle which rests loosely at the bottom of the can, so that all parts may be readily removed therefrom for cleansing. The arrangement is such that, when the can is filled with milk and the mechanism described associated therewith, the conventional outer can cover may be applied and sealed with all of the parts housed within the confines of the can in a clean and sterile condition, to be shipped in this way to the retail dealer who, upon removal of the conventional cover, may attach thereto a device for operating the pump mechanism for the purpose of discharging the milk from the can in measured quantities. The device which the dealer attaches and which operates the pump mechanism does not come in contact with the milk and even though due cleanliness is not practiced in connection with this device, it cannot effect pollution thereof.

Features of the invention, other than those adverted to, will be apparent from the hereinafter detailed description and claims when read in conjunction with the accompanying drawings.

The accompanying drawings embody one practical embodiment of the invention, but the construction therein shown is to be understood as illustrative, only, and not as defining the limits of the invention.

Figure 2 is a view similar to Figure 1, but showing the parts with the pump piston in fully elevated position.

Figure 3 is a fragmental section showing the can and associated parts as they are sealed at the creamery for shipment to the retailer.

Figure 4 is a plan view of Figure 3.

Figure 5 is a plan view of Figure 1.

Figures 6 and 7 show modified forms of the invention.

Figure 1:
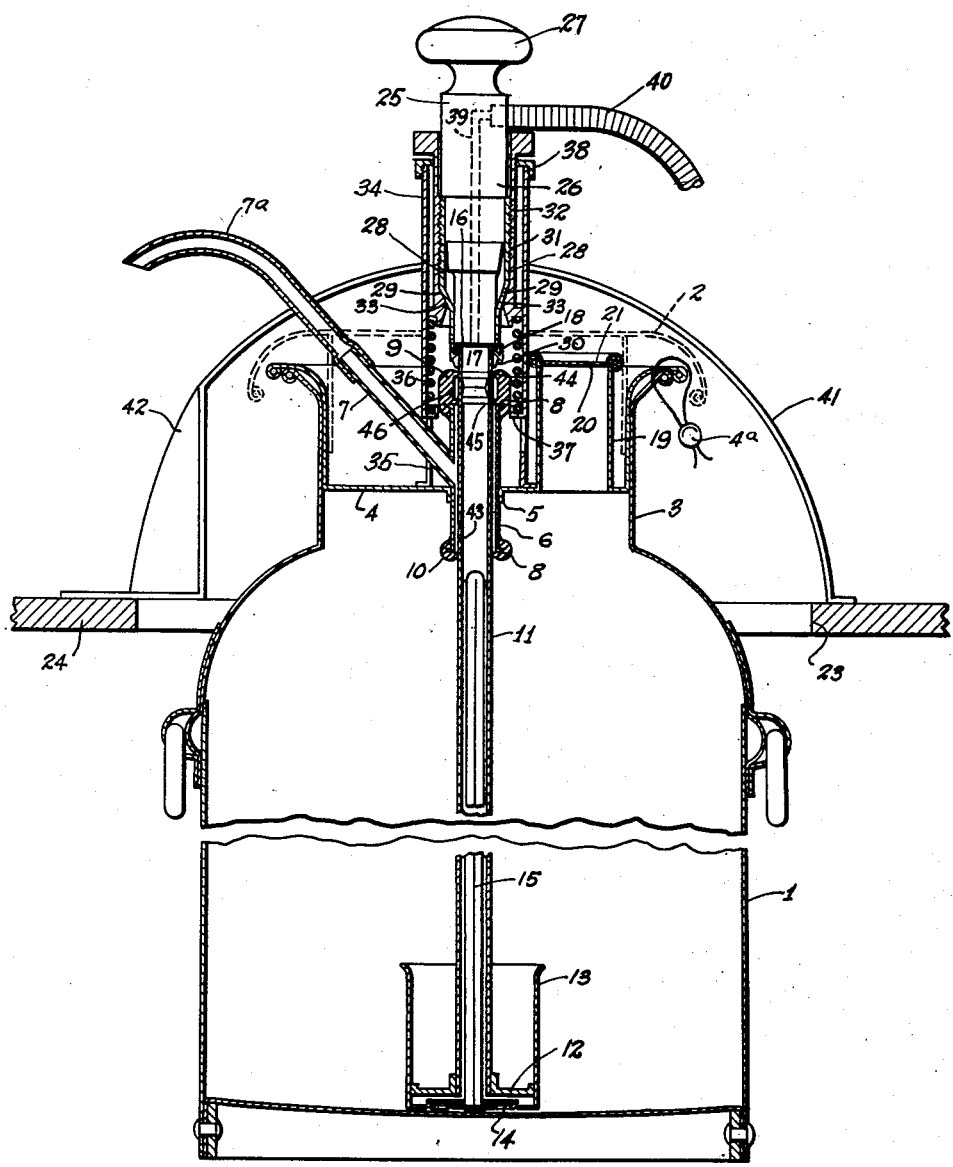
Figure 1 is a vertical central section of a cam embodying the present invention having associated therewith the mechanism for operating the dispensing devices in the can. In this figure the pump piston is shown in its lowermost position.

Referring to the drawings I designates a can, such as is conventionally used for the wholesale distribution of milk. These cans are usually of the 20 or 40 quart variety. 2 is the conventional cover which, in practice, fits into the neck 3 of the can and is sealed when the milk is shipped from the creamery.

In adapting the invention to a can of this kind no changes are required in the conventional can.

On the contrary, I provide a cupped supplementary inner cover 4 adapted to fit into the neck of the regular can from the open top thereof as clearly shown in the accompanying drawings. This inner cover makes a tight joint with the neck and the rolled top of the can.

The center of the inner cover 4 is provided with an opening having a peripheral flange 5 and through this opening extends a sleeve 6 which projects above and below the opening as shown. This sleeve has a tight fit with the opening and is soldered therein so as to be rigid therewith. The sleeve 6 is provided, above the base of the inner cover 4, with an outlet spout 7 rigidly secured to the sleeve by soldering or otherwise and this spout is sufficiently short so as to terminate slightly above the top of the can but below the cover 2. A spout extension 7a has a sliding fit over the end of the spout 7 and is used as hereinafter described.

Sleeve 6 is provided at its top and bottom with outwardly extending flanges 8 and with these flanges cooperate soft rubber packing rings 9 and 10 which extend beyond the upper and lower ends, respectively, of the sleeve and are adapted to closely embrace and conform to the tubular stem 11 of a pump piston 12. This stem 11 extends through the sleeve from a point above the upper end thereof to the bottom of the can and is adapted to slide through the packing rings 9 and 10 without noise, while the rings maintain a close fit with the outer surface of said stem.

The piston 12 is preferably of rubber or other resilient material but is rigidly secured to the lower end of the stem 11 and is adapted for vertical reciprocation within a measuring cup 13. This cup rests loosely on the bottom of the can 1 and is of a volume appropriate to the quantity of milk which it is desired to dispense at each operation. The cup has a perforated bottom normally closed by a gravity operated valve disk 14 which may be of paper or any other suitable material and which in practice normally gravitates into a position to rest upon annular beads 13a surrounding the perforations to seal them.

The measuring cup is riveted to an upstanding guide post 15 preferably of polygonal cross section and extending well up into the tubular stem 11. I preferably make this guide post square to leave a milk discharge passage of small volume between the post and the interior of the tubular stem so that a large volume of milk is required to fill the tube during dispensing operations. The stem 11 also functions to hold the post in coaxial relation therewith to thus centralize the measuring cup for cooperation with the piston 12 even though such piston is elevated above the top of the cup.

The piston stem 11 extends above the sleeve 6, as stated, and is provided at its upper end with an outwardly extending flange 16 to which is locked a check valve member 17 of the same kind, as is disclosed in my copending application, Serial No. 241,899 now Patent No. 2,186,063. This check valve member comprises a metal thimble carrying a rubber plug having an integral check valve element associated therewith to permit air to enter the can, but to preclude the retrograde flow of liquid or fluid. The metal tongues 18 of the metal thimble of the rubber plug are bent into engagement with the flange 17 of the stem 11 and normally lock the check valve plug to the stem.

The supplementary inner cover has a rigid filling and sterilizing tube 19 which extends to a point above the top of the can and terminates below the cover 2. This tube is normally closed by a single service cap 20 having a vent opening 21.

When an empty can is returned to the creamery or wholesale milk distributor after the contents thereof have been dispensed, the parts appear as shown in Figure 3. The outer cover 2 is in place on the can and in the space beneath the cover 2 and above the inner cover 4 is housed the extension spout section 7a which may rest loosely in this space but is preferably held in an appropriate spring clip 22 therein.

After the can is received it is thoroughly cleansed and sterilized in the following manner. The outer cover 2 is removed and then the inner supplementary cover 4 is pulled from the can, carrying with it the sleeve 6, piston stem 11 and the piston 12. The operator reaches into the can, grasps the post 15 and lifts it out, together with the measuring cup to which it is secured. The check valve member 17 is now removed by bending the tongues 18 to free them from the flange 16 of the stem and the piston stem is then pulled bodily out of the sleeve 6 in a downward direction, the packing rings 9 and 10 being sufficiently flexible to permit of this operation. The packing rings may now be removed from the sleeve and discarded, if desired, as these rings are inexpensive and are adapted for a single use. The cap 20 is removed and discarded.

By the foregoing steps, all relatively movable parts of the structure have been quickly and easily dismantled externally of the can, so that the can and all of these parts individually can be thoroughly cleaned. After this has been done all of the parts which I have described having been reassembled by reversing the operations carried out in dismantling the same, a new check valve member is secured in place, the supplementary inner cover is returned to the can and forced to a tight fit therein with the filling tube unsealed and the nozzle extension 7a is placed in the clip 22. The entire assembly is now thoroughly sterilized.

After sterilization, the can is filled with milk through the filling tube 19 and a new cap 20 thereupon applied to this tube. A suitable seal 4a is next passed through perforations in the can and in the inner cover 4 to seal this inner cover against surreptitious removal and replacement. Thereafter the outer cover 2 is applied and the usual seal 2a is passed through a perforation in this outer cover and downwardly through one of the handles of the can to also seal the can against surreptitious opening. The can is now ready for shipment to the retailer with all parts which come in contact with the milk in a clean and sterile condition. So they will remain until the milk is fully dispensed from the can.

When the can of milk is received by the retail dealer, he places the same in any desired position from which it may be his practice to dispense milk. As shown in Figure 1 the can is shown as mounted to project upwardly through an opening 23 in a counter 24.

Having placed the can in this position, the retailer removes the cover 2 and applies the extension 7a to the spout 7. He then attaches to the piston stem, a stem operating device designated generally by the reference character 25 and embodying the following structural elements; 26 designates a plunger provided at its upper end with a knob 27. To the side of this plunger are secured a plurality of resilient gripping members 28 provided intermediate their ends with tapering offsets 29 and having at their lower ends shouldered gripping heads 30. When the lower end of the plunger 26 is resting on the top of the piston stem 11 the shouldered heads 30 are adapted to be positioned below and adjacent to the flange 17 of said stem. The gripping members 28 are, moreover, threaded, as at 31 and over these threads is screwed a threaded adjusting sleeve 32 provided near its lower end with a frusto conical inner surface 33 adapted to co-operate with the tapered offsets 29. When the adjusting sleeve 32 is screwed downwardly the gripping members 28 are adapted to separate under their own inherent resiliency, to permit the heads 30 to move to a position below the flange 17 and when the parts are in this position the adjusting sleeve may be screwed upwardly to engage the frusto conical portion 33 with the tapering offsets 29 of the gripping members and force the heads 30 into gripping relation with the flange of the piston stem 11 to thereby lock the plunger to the stem. The adjusting sleeve and plunger are guided for conjoint vertical reciprocation within a tubular cage 34 adapted to rest on the base of the supplementary cover 4, the side of the cage being cut out at 35 to straddle the spout 7. A helical spring 36 is interposed between fingers 37, inturned from the wall of the cage, and the lower end of the adjusting sleeve 32 and serves to normally elevate the adjusting sleeve and plunger to a position wherein the piston will be at or above the top of the measuring cup 13 as shown in Figure 2. The top of the cage 34 is closed by an annular screw cap 38.

It will be of course understood that when attaching the gripping members 28 to the stem 11 the plunger should be held in lowered position, so as to compress the spring 36 sufficiently to permit the gripping heads 30 to engage with the flange 17 but, after these parts have been engaged and the adjusting sleeve 32 screwed upwardly to lock them in place, the parts may be released for the plunger will then be locked to the piston for normal operation.

As shown best in Figure 1, the plunger is provided with a passage 39 which extends therethrough so that the lower end of this passage communicates with the check valve of the rubber plug 16, while the upper end of the passage is connected to a flexible conduit 40 leading to a suitable source of air under pressure. Preferably cooled or refrigerated air is thus adapted to be fed from time to time to the piston stem and downwardly therethrough, to be discharged into the milk within the can and near the bottom thereof. This air, rising to the surface, will agitate the milk and assure a thorough distribution of the cream therethrough. In practice there is provided an appropriate air filter for the air which passes through the tube 40 and this filter is made renewable so that it may be changed from time to time in order that the air entering the milk may be thoroughly filtered and divested of all impurities.

After the piston operating device is secured to the piston in the manner described, a two part centrally divided cover 41 is placed over the opening 23 and serves to conceal the upper part of the can as shown in Figures 1, 2 and 5. The cover is recessed at 42 to give clearance for a tumbler beneath the spout extension 7a.

The normal position of the parts, when ready to dispense milk, is as shown in Figure 2, with the spring 36 holding the piston 12 at a point above the top of the measuring cup, so that milk will flow into the cup, while air introduced from time to time through the tube 40 will bubble up through the milk and keep it in a state of agitation with the cream thoroughly distributed therethrough. To dispense milk, downward pressure is applied to the knob 27 and this pressure is transmitted through the plunger 26 to the piston stem 11, so that the piston is depressed. The valve disk 14 rests on the beads 13a at the bottom of the cup 13 to close the perforations therein and the milk is thus caused to rise in the piston stem about the post 15. As it fills the piston stem, it flows through an outlet port 43 into the sleeve 6 and thence through the spout 7 and extension 7a to be received into a tumbler held beneath the outlet end of the spout extension. By the time the piston has been forced to the bottom of the measuring cup the requisite quantity of milk will have been dispensed to fill the tumbler and if pressure is now relieved from the knob 27, the spring 36 will elevate the plunger and piston while the valve disk 14 will raise to uncover the perforations in the bottom of the measuring cup, so that the milk may flow into the cup and charge the same for a subsequent dispensing operation.

It will be noted that the measuring cup rests on the bottom of the can which is preferably domed downwardly so that practically all of the contents of the can may be dispensed in the manner described. The bottom of the cup is spaced from the bottom of the can by the headed over lower end of the post 15, so that milk can freely enter the perforations in the bottom of the cup. In practice, the piston should be resilient or yielding or fit into the measuring cup rather loosely, so that the weight of the cup and its post will hold the cup at the bottom of the can when the piston is raised, although if the cup is raised slightly with the piston as the piston is elevated, this will do no harm as the weight of the cup will cause it immediately to descend as the milk flows into the cup below the piston.

When the knob 27 is released and the piston stem raised by the spring 36, the outlet port 43 of said stem comes to rest in juxtaposition with a closed annular space 46, formed in the upper packing ring 9 between two spaced apart ribs 44 and 45 as shown in Figure 2. These ribs closely embrace the stem 11 above and below said outlet port and seal the same so that air introduced through the tube 40 will pass downwardly through the stem to the milk and will not escape through said port to the spout.

It will be noted that in the dispensing of the milk in the manner described, all parts of the device with which the milk comes in contact are such that they may be thoroughly cleaned and sterilized at the creamery, so that the retail dealer is not required to do any cleaning or sterilizing of any of said parts.

After the entire contents of the can have been dispensed in the manner stated, the piston operating device 25 is removed from the can by simply screwing down the adjusting sleeve 32. This will release the piston operating device from the piston stem 11 and after it has been removed, the extension 7a is removed and engaged with the clip 22. The outer cover 2 is then placed on the can and the can with the sleeve 6, piston stem 11, piston 12, measuring cup and the spout extension 7a, are returned to the creamery for cleaning, sterilization and refilling, as hereinbefore described.

In Figure 6 of the drawings I have shown a modified form of device for operating the piston stem 11 and its associated piston 12. This device differs from the structure shown in Figures 1 and 2 in that it is adapted to rest on top of the peripheral flange of the inner cover instead of on the base of said inner cover as in the preceding figures. To this end a relatively narrow but stiff strip of metal is bent to form a bracket or yoke 46 which is adapted to rest on the peripheral flange of the cover 4, i. e., substantially on the top of the can and on this bracket is rigidly supported an upstanding tubular section 47 preferably soldered or welded to the bracket 46 which bracket is provided with a central opening 48 through which the piston stem 11 is adapted to operate. Telescoping downwardly over the tubular section 47 is an inverted tubular section 49 closed at its upper end and having a central opening through which the plunger 26 extends. The plunger is welded or soldered to the tubular section 49, so as to move therewith and a spring 50, which corresponds to the spring 36, is housed within the tubular sections 47 and 49 and tends to normally elevate the plunger 26.

The plunger 26 has a knob 27 as hereinbefore described and is provided through its center with an air passage 39 to which air is supplied through the tube 40. In the structure of Figure 6 instead of employing the clutch construction of Figures 1 and 2, I employ two leaf springs 51 secured to the plunger by rivets 52 or in any other suitable way and these leaf springs are biased so as to normally separate but are provided at their lower ends with inturned fingers 53 adapted to grip the flange 16 at the upper end of the piston stem when these springs are forced together by a locking ring 54 which slidably embraces them.

When it is desired to associate this piston operating device with the piston stem the plunger 26 is depressed all of the way to bring its lower end below the bracket 46 and into convenient position. The locking ring 54 is then raised so that the leaf springs 51 may separate sufficiently to permit their lower ends 53 to straddle the flange 16 and the locking ring 54 is then lowered to force these leaf springs into gripping relation with the flange 16 and thus lock the piston operating device to the piston. Thereafter the structure operates in the same way as hereinbefore described.

The advantage of the structure of Figure 6 is that it is simpler than the corresponding device of the other figures and is more accessible and convenient to attach and detach.

In Figure 7 I have illustrated a simplified form of piston stem and delivery spout construction wherein the sleeve 6 of the previous figures is dispensed with. In the construction of Figure 7, the spout section 7b is formed directly on the piston stem 11b and the piston stem operates with a sliding fit through a rubber packing ring 10b detachably supported on the margin of a central hole in the supplemental cover 4b. The packing ring 10b is similar to a rubber grommet, but preferably is provided with internal annular beads which will produce a tight joint yet will permit the piston stem 11b to slide easily therethrough. The arrangement shown in Figure 7 may be employed in conjunction with the piston operating device shown in Figure 6 or with any other suitable piston operating device.

The device of this invention is adapted for the safe and sanitary distribution of milk and this is particularly so as creameries are thoroughly equipped for cleaning and sterilization whereas retail dealers are lacking in such equipment as will insure uniform cleanliness.

The foregoing detailed description sets forth the invention in its preferred practical form, but the invention is to be understood as fully commensurate with the appended claims.

Having thus fully described the invention, what I claim as new and desire to secure by Letters Patent is:

1. A milk dispenser comprising a supplementary inner cover adapted to snugly detachably fit into the neck of a milk delivery can beneath the conventional outer can cover, a sleeve extending through and rigid with said inner cover, a spout on said sleeve, a tubular piston stem extending through the sleeve and having a discharge port located therein, a piston on said stem, a measuring cup adapted to loosely rest on the bottom of the can and forming a cylinder for said piston, an inlet check valve to admit milk from the can into said cylinder, and a central post carried by said cup and projecting upwardly into said tubular piston stem for a distance greater than the stroke of the piston, said piston stem being of less length than the height of the can with which it is adapted for use to permit the outer cover to be applied to the can with dispenser housed therein.

2. A milk dispenser comprising a supplementary inner cover adapted to snugly detachably fit into the neck of a milk delivery can beneath the conventional outer can cover, a sleeve extending through and rigid with said inner cover, a spout on said sleeve, a tubular piston stem extending through the sleeve and having a discharge port located therein, a piston on said stem, a measuring cup adapted to loosely rest on the bottom of the can and forming a cylinder for said piston, an inlet check valve to admit milk from the can into said cylinder, and a central post carried by said cup and projecting upwardly into said tubular piston stem for a distance greater than the stroke of the piston.

3. A milk delivery can provided with a supplementary inner cover fitted into the top of the can and carrying a sleeve extending therethrough, a tubular piston stem extending through said sleeve for reciprocation therein, a spout extending from said sleeve, a piston secured to the inner end of the piston stem, and a measuring cup resting on the bottom of the can and forming a cylinder in which said piston is operable, said cup having a guide post extending into the tubular piston stem for a distance greater than the throw of the piston to maintain the measuring cup in coaxial relation to the piston, and a check valve on the measuring cup to permit milk to enter the cup beneath the piston when the piston is elevated and to preclude the exit of such milk from the cup when the piston is depressed.

4. A milk dispenser comprising a supplementary inner cover adapted to snugly detachably fit into the neck of a milk delivery can beneath the conventional outer can cover, a sleeve extending through and rigid with said inner cover, a spout on said sleeve, a tubular piston stem extending through the sleeve and having a discharge port located therein, a piston on said stem, a measuring cup adapted to loosely rest on the bottom of the can and forming a cylinder for said piston, a handle detachably secured to the outer end of the piston stem, and means for feeding compressed air to the handle to pass therethrough and through the piston stem into the can to agitate the milk therein.

5. A milk dispenser comprising a supplementary inner cover adapted to snugly fit into the neck of a milk delivery can beneath the conventional outer can cover, a sleeve extending through and rigid with the inner cover, a spout on said sleeve, a tubular piston stem extending through the sleeve and having a discharge port located therein, a piston on said stem, a cylinder at the bottom of the can in which said piston is operable, and a check valve detachably secured to the outer end of the tubular piston stem to permit air to enter the tube and preclude the passage of liquid in a counter direction.

6. A milk dispenser comprising a supplementary inner cover adapted to snugly fit into the neck of a milk delivery can beneath the conventional outer can cover, a sleeve extending through and rigid with the inner cover, a spout on said sleeve, a tubular piston stem extending loosely through the sleeve and having a discharge port located therein, elastic packing rings carried by the upper and lower ends of the sleeve and resiliently embracing the tubular piston stem to form between the packing rings and within the sleeve an outlet passage with which the spout communicates, a piston on the inner end of said stem, a cylinder in which said piston is mounted for operation, means for passing air through the piston stem, and means for normally holding the piston and its stem in elevated position, the upper packing ring being formed to enclose the discharge port of the piston stem when the latter is in elevated position.

7. A packing ring comprising a rubber annulus provided interiorly and at one end thereof with an annular groove to embrace and grip one end of a flanged tubular sleeve and provided interiorly with axially spaced apart annular ribs adapted to closely embrace a tube adapted to extend therethrough and to form within said ring and about the tube a closed annular space.

8. A milk dispenser comprising a milk delivery can, a sleeve extending through and rigid with the upper part of the can, a spout on said sleeve, a tubular piston stem extending through the sleeve and having a discharge port located therein, a piston on said stem, a measuring cup adapted to loosely rest on the bottom of the can and forming a cylinder for said piston, an inlet check valve to admit milk from the can into said cylinder, and a central post carried by said cup and projecting upwardly into said tubular piston stem for a distance greater than the stroke of the piston.

9. A milk delivery can, a sleeve extending through the upper portion of the can, a tubular piston stem extending through said sleeve for reciprocation therein, a spout extending from said sleeve, a piston secured to the inner end of the piston stem, and a measuring cup resting on the bottom of the can and forming a cylinder in which said piston is operable, said cup having a guide post extending into the tubular piston stem for a distance greater than the throw of the piston to maintain the measuring cup in coaxial relation to the piston, and a check valve on the measuring cup to permit milk to enter the cup beneath the piston when the piston is elevated and to preclude the exit of such milk from the cup when the piston is depressed.

10. A milk dispenser comprising a milk delivery can, a sleeve extending through and rigid with the upper portion of the can, a spout on said sleeve, a tubular piston stem extending through the sleeve and having a discharge port located therein, a piston on said stem, a measuring cup adapted to loosely rest on the bottom of the can and forming a cylinder for said piston, a handle detachably secured to the outer end of the piston stem, and means for feeding compressed air to the handle to pass therethrough and through the piston stem into the can to agitate the milk therein.

11. A milk dispenser comprising a milk delivery can, a sleeve extending through and rigid with the upper part of the can, a spout on said sleeve, a tubular piston stem extending through the sleeve and having a discharge port located therein, a piston on said stem, a cylinder at the bottom of the can in which said piston is operable, and a check valve detachably secured to the outer end of the tubular piston stem to permit air to enter the tubular piston stem and preclude the passage of liquid in a counter direction.

12. A milk dispenser comprising a milk delivery can, a sleeve extending through and rigid with the upper part of the can, a spout on said sleeve, a tubular piston stem extending loosely through the sleeve and having a discharge port located therein, elastic packing rings carried by the upper and lower ends of the sleeve and resiliently embracing the tubular piston stem to form between the packing rings and within the sleeve an outlet passage with which the spout communicates, a piston on the inner end of said stem, a cylinder in which said piston is mounted for operation, means for passing air through the piston stem, and means for normally holding the piston and its stem in elevated position, the upper packing ring being formed to enclose the discharge port of the piston stem when the latter is in elevated position.

13. A milk dispenser comprising a milk delivery can, a tubular piston stem extending vertically within the confines of the can, a piston on said stem, a cylinder at the bottom of the can in which said piston is operable, and a check valve detachably secured to the upper end of the tubular piston stem to permit air to enter the can through the tubular piston stem and preclude the passage of liquid in a counter direction through the upper end of the tubular piston stem, said piston stem having a liquid outlet through its side wall below said check valve.

14. A milk dispenser comprising a milk delivery can having a tubular piston stem extending upwardly within the confines of the can and having a discharge port near its upper end, a piston on said stem, a measuring cup adapted to loosely rest on the bottom of the can and forming a cylinder for said piston, an operating handle detachably secured to the upper end of the piston stem, and means for feeding compressed air to the handle to pass therethrough and through the piston stem into the can to agitate the milk therein.

15. A milk dispenser comprising a milk delivery can having a tubular piston stem extending upwardly through the confines thereof, a piston secured to the lower end of the piston stem, and a measuring cup at the bottom of the can and forming a cylinder in which said piston is operable, said cup having a guide post extending into the tubular piston stem and upwardly for the greater portion of the height of the can.

WILLIAM TAMMINGA.